May 23, 1933.  J. CAGE  1,910,213
AUTOMATIC SCENIC DISPLAY APPARATUS
Filed Jan. 26, 1931  5 Sheets-Sheet 2
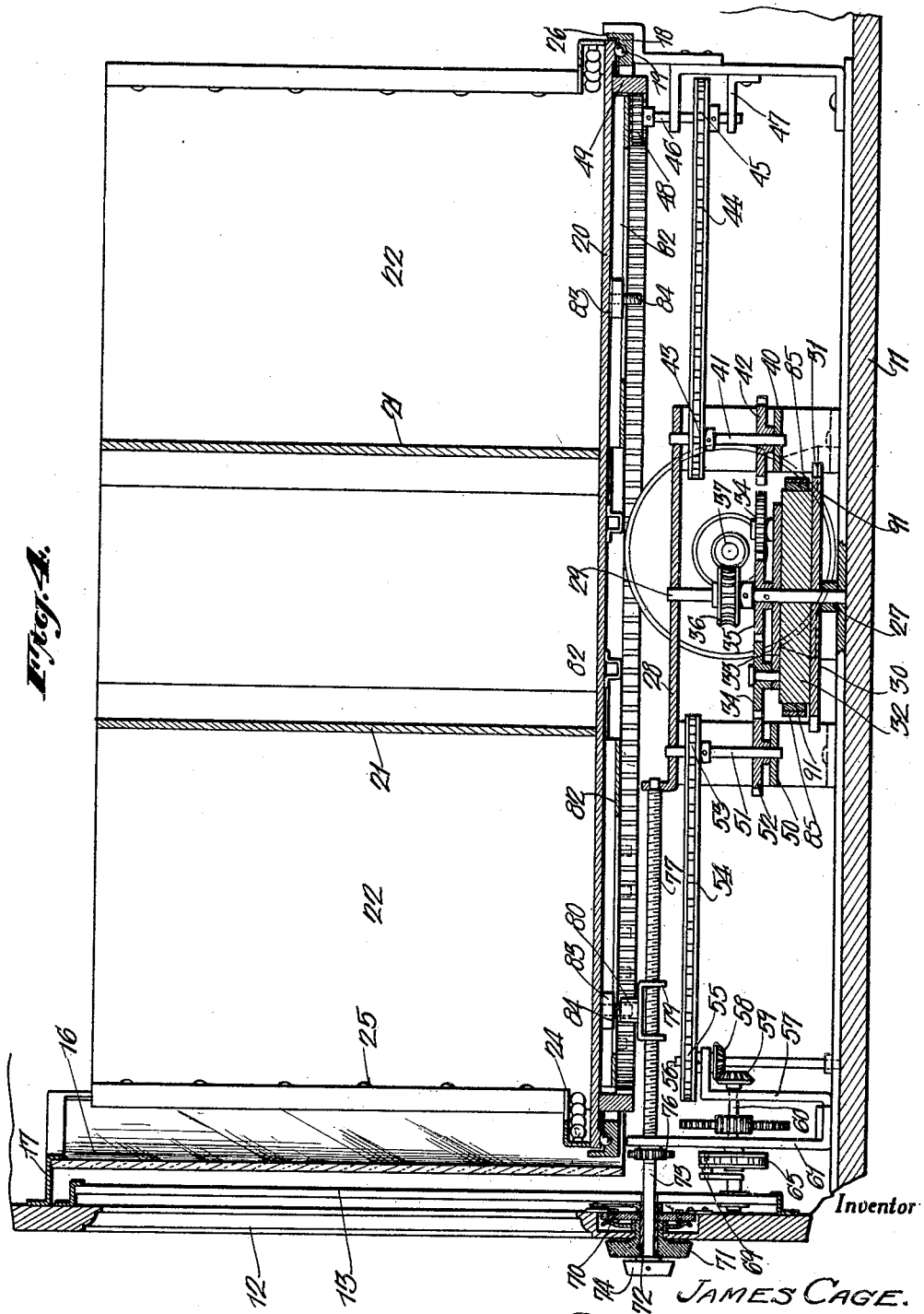
Inventor
JAMES CAGE.
By Clarence A. O'Brien
Attorney

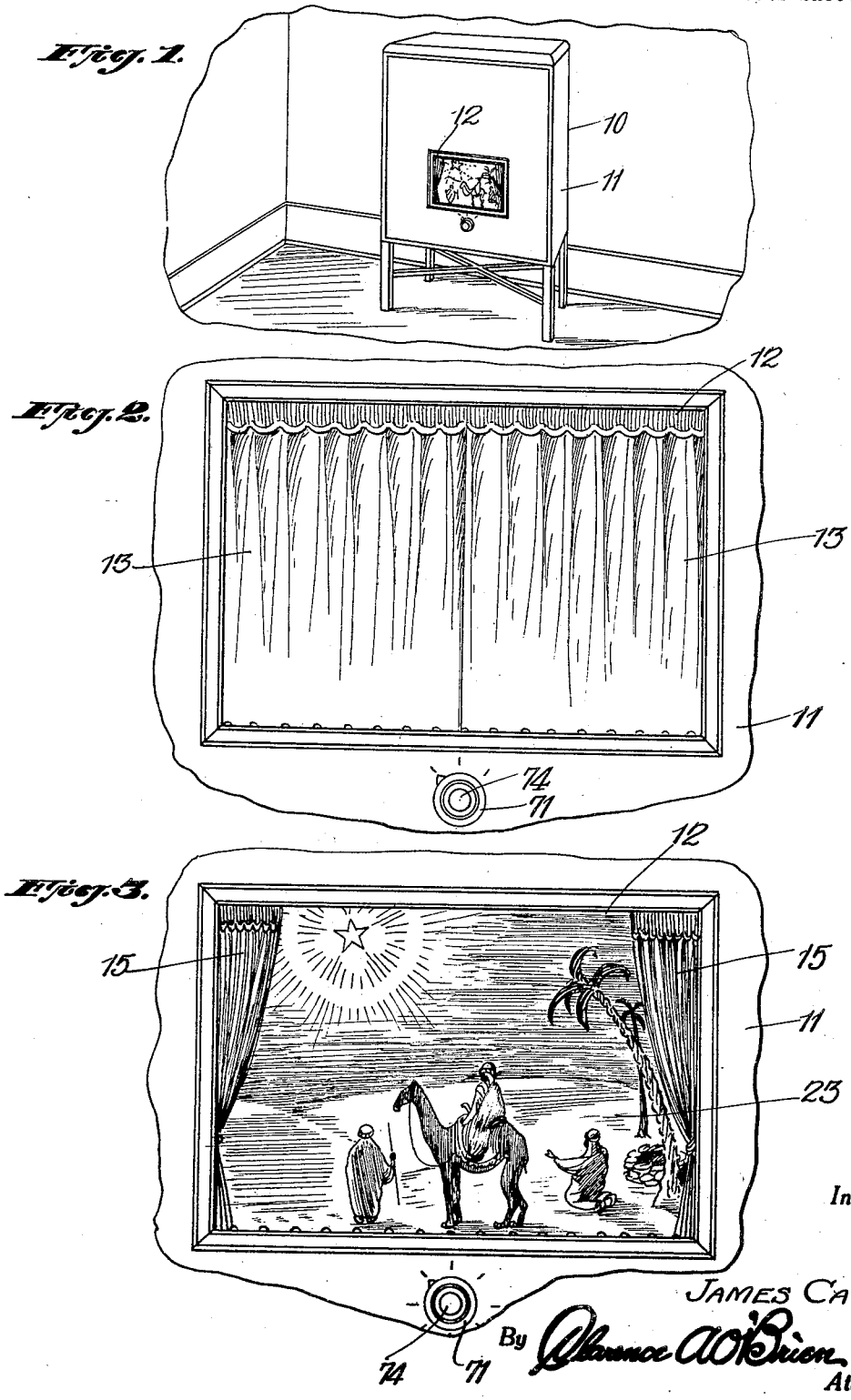

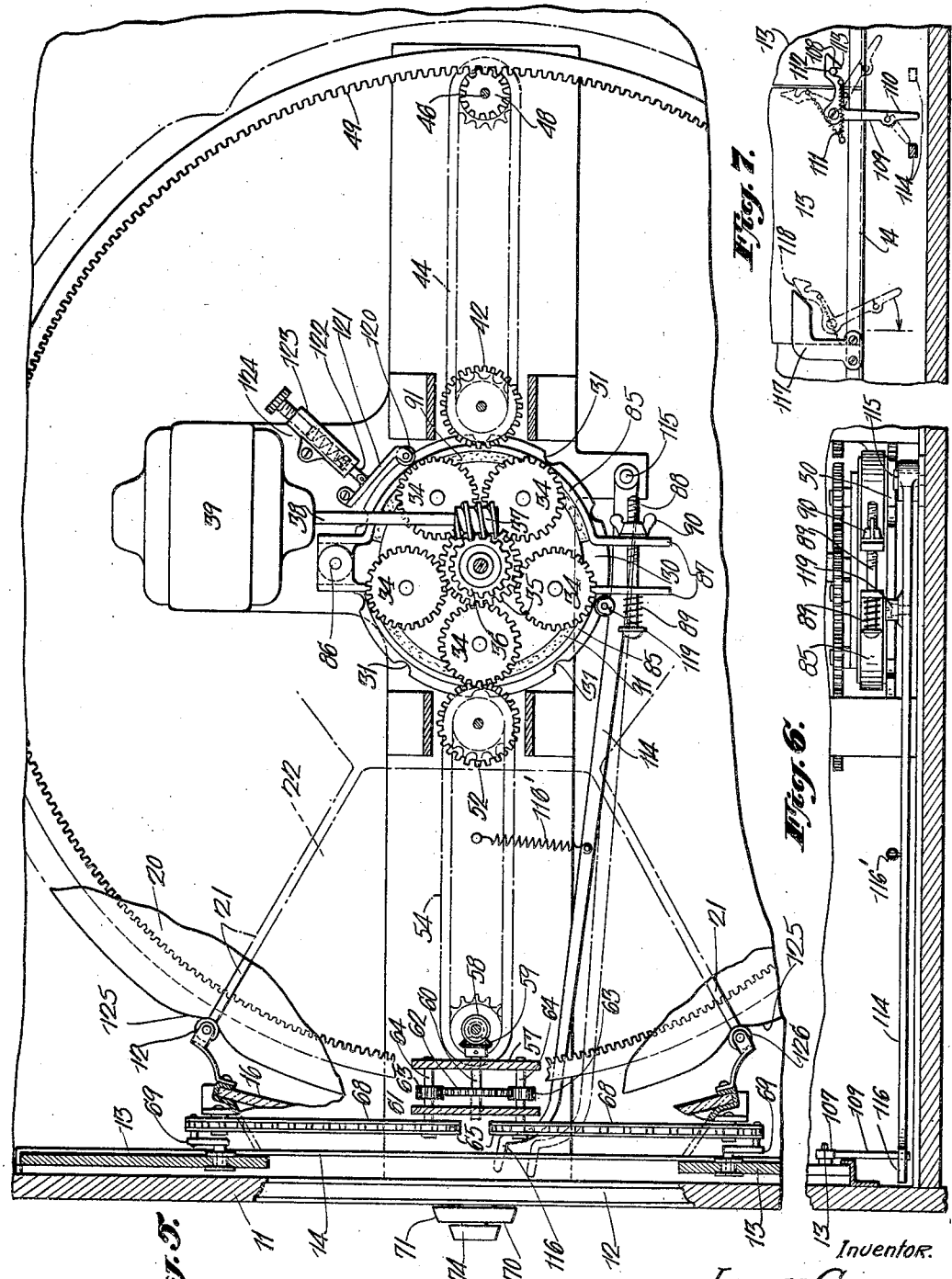

May 23, 1933. J. CAGE 1,910,213
AUTOMATIC SCENIC DISPLAY APPARATUS
Filed Jan. 26, 1931 5 Sheets-Sheet 4

Inventor
JAMES CAGE.
By Clarence A. O'Brien
Attorney

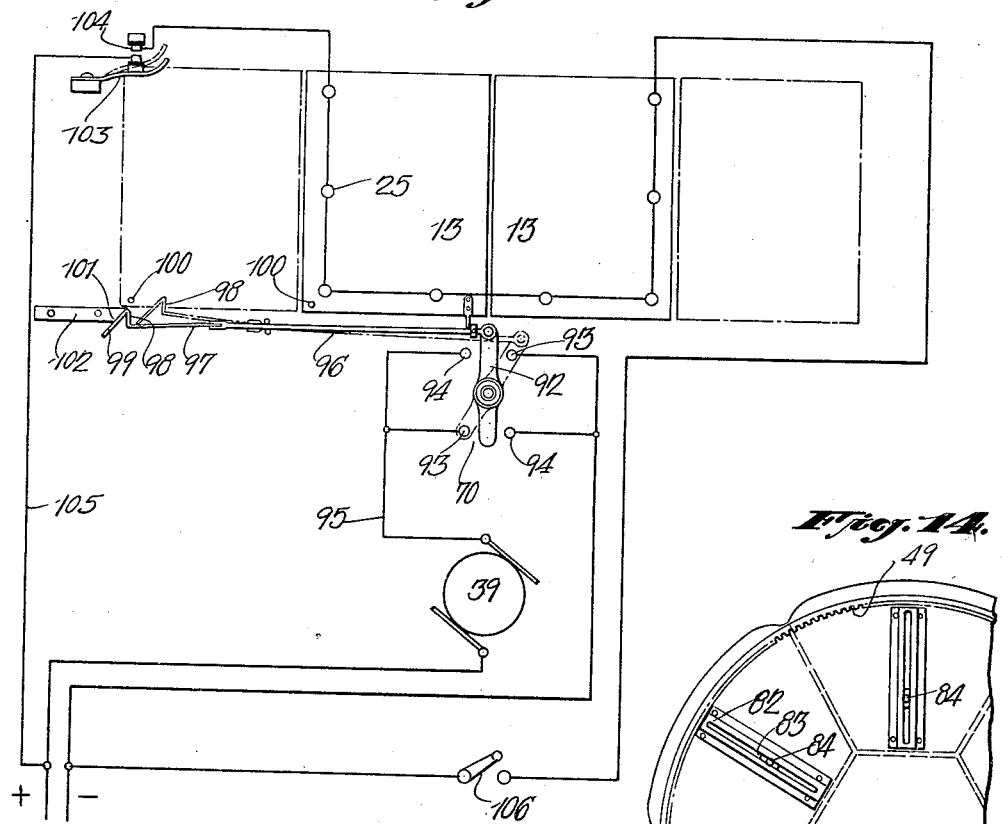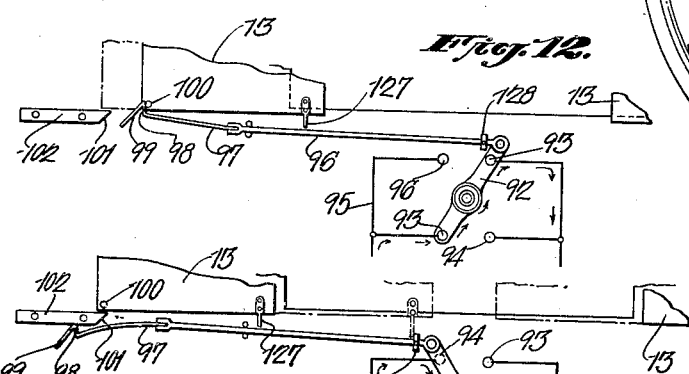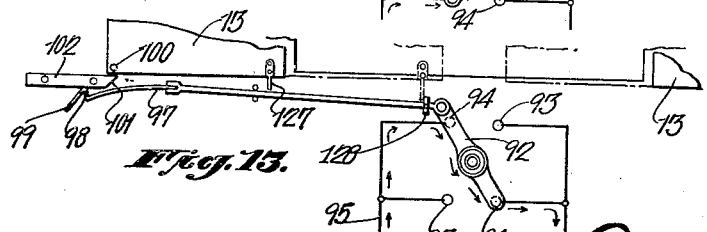

Patented May 23, 1933

1,910,213

UNITED STATES PATENT OFFICE

JAMES CAGE, OF VALLEY STREAM, NEW YORK

AUTOMATIC SCENIC DISPLAY APPARATUS

Application filed January 26, 1931. Serial No. 511,378.

This invention relates to improvements in changeable scenic display apparatus and while at once apparent as to its scope for other specific purposes for which this invention has been created and is intended, has particular reference to such apparatus as may be embodied in sound reproducing instruments such as radio receiving sets, and phonographs, so as to visibly impart to the listeners thereof, certain scenes significant to the sound being produced, which may suggest scenic effects in keeping with the seasons or holidays of a year, or any scene imaginable that may be desired to coincide in thought with the sound being listened to or being broadcast.

It is well understood that music, or whatever the broadcast may be, suggests to the minds of listeners, certain scenes or pictures with which such music or broadcast is associated and it is the purpose of my invention to selectively bring such scenes or pictures into view while listening to the music or broadcast, of which they are suggestive, so as to afford greater enjoyment of the music or broadcast, by the listeners, and enhance the value of said broadcast immeasurably in many obvious ways.

Another object of the invention resides in a changeable stage which may be compactly embodied in the cabinet of a sound reproducing machine, and which embodies a plurality of stage settings, and means for selectively causing the settings to be brought into display position.

Another object is to provide curtain or shutter means for concealing the stage from view during automatic changing of the scenes, and automatic means for opening the curtain or shutter means after the changing of a scene to present the selected scene to view, and automatic means for closing the curtain or shutter means when it is desired not to bring any more scenes into view and turn off the apparatus completely and have the curtain or shutter means remain closed.

With these and other objects in view, the invention resides in the certain novel construction, combination and arrangement of parts, the essential features of which are hereinafter fully described, are particularly pointed out in the appended claims, and are illustrated in the accompanying drawings, in which:

Figure 1 is a perspective view of a sound reproducing instrument equipped with my improved scenic display apparatus.

Figure 2 is a fragmentary front elevational view of the stage with the closure doors in closed position.

Figure 3 is a similar view but showing the doors in an open position.

Figure 4 is an enlarged fragmentary vertical longitudinal sectional view through my scenic display device with the doors shown in open position.

Figure 5 is a fragmentary horizontal sectional view therethrough with the turn table broken away.

Figure 6 is an enlarged fragmentary detail vertical sectional view showing the planetary drive mechanism in elevation.

Figure 7 is a vertical sectional view showing the door latching means in latching position in full lines, and in unlatching position in dotted lines.

Figure 8 is a fragmentary vertical sectional view showing the door actuating mechanism in elevation.

Figure 9 is a detail plan view of the manually operable selective stop means.

Figure 10 is a detail vertical transverse sectional view on the line 10—10 of Figure 9.

Figure 11 is a diagrammatic view of the controlling switch and the means for automatically actuating the same from an "on" to an "off" position.

Figure 12 is a detail diagrammatic view showing the position of the control switch and its actuating parts when the switch is in an "on" position.

Figure 13 is a similar view but showing the position of the switch and its corelated parts when the switch is moved to an "on" position when it is desired to close the doors and render the device inoperative.

Figure 14 is a fragmentary bottom plan view of the under side of the turn table.

Referring to the drawings by reference characters, the number 10 designates a sound reproducing instrument which may be a radio receiving set, or a phonograph, and which embodies a hollow casing 11 having a display or stage opening 12 in the front wall thereof, while slidably mounted on the inner front wall of the casing 11 are a pair of separate doors or closure members 13—13. These closure members are slidable on rails or tracks 14 and when moved to closed position, the same are in abutting engagement with each other, but which are slidable to an open position simultaneously in opposite directions in a manner to be presently explained. Although I have shown solid doors 13, the outer surfaces of the same may be painted to simulate a stage curtain or draperies may be hung therefrom to lend an artistic touch to the device, and to be within keeping of the impression which the device is adapted to impart. If desired, side drapes 15 may be arranged at opposite sides of the display opening 12 which are disposed rearwardly of the plane of the doors so as to be concealed when the doors are closed, and visible when the same are open. A magnifying lens 16 is supported by brackets 17 attached to the inner side of the front wall of the casing and which lens extends entirely across the display opening 12, but is disposed behind the sliding doors 13—13 for the purpose of enlarging and giving detail to the miniature scenic displays adapted to be brought into view in register with the display opening, in a manner to be hereinafter explained.

Supported within the casing on a plane just below the bottom of the display opening in the front wall of the casing is a ring member 18 provided with a ball race 19 which turnably supports a platform or turn table 20. Rising from the turn table 20 and extending radially from the axis thereof are partitions or dividing walls 21 which serve to divide the stage or turn table into a plurality of separate individual compartments 22, each of which is adapted to contain a miniature scene as shown in Figures 1 and 3 by the reference character 23. Extending around the turn table 20 and rising thereabove is an angular flange 24, which flange is also carried upwardly along the outer side edges of the walls of the compartment 22 and which support electric lamps 25 for throwing light inward of the compartment to illuminate the same as the various scenes are brought into registration with the display opening. Also certain scenes may carry their own lighting bulbs where lighting within the scene itself is required, such as a light over a prize fight ring scene, etc., which should be part of such scenes. An annular flange 26 rises from the outer side of the ring member 18 so as to prevent accidental shifting of the rotatable turn table relative to its support.

It might be here stated that various scenic sets or stage settings may be provided in the respective compartments 22 such as those suggestive of certain music or sound which may be reproduced by the sound reproducing instrument 10. For instance a setting may be arranged suggestive of a certain opera, while another may contain the setting of a cabaret, while still another may depict an athletic event such as a boxing match or foot ball game. Although I have specifically mentioned certain scenes which may be arranged in the various compartments, I do not wish to restrict myself to any scenic display, but several have been suggested in order that the idea which I wish to convey may be clearly set forth. It will be seen that should the radio or phonograph 10 be reproducing an operative selection, it would be most appropriate to bring the operatic scene into view, while should the radio be reproducing a broadcast of an athletic event such as a boxing match, or foot ball, or base ball game, or religious, or of Christmas, or whatever the broadcast may be, then a scene suggestive of the event would be appropriate for display. Also, scenes or sets depicting certain characters or persons, or anything that would tie up with the broadcasting on regular schedules over the radio on behalf of advertisers may be provided, and the scenes or sets distributed through the advertisers for additional advertising purposes. In the description which is to follow, I will clearly describe the means by which the various scenes are selectively brought into display position, and which operates in timed relation with respect to the opening and closing of the doors 13.

Journaled in spaced bearings 27 and 28 is a vertically disposed shaft 29, the axis of which is in alinement with the axis of the turn table 20, but which shaft is disposed below the turn table as best seen in Figure 4 of the drawings. Freely mounted on the shaft 29 adjacent the lower end thereof is a disk 30 provided with equidistantly spaced notches 31 in the periphery thereof and which notches perform a function to be hereinafter explained. Loosely mounted on the shaft 29 and fixed to the disk 30 is a rotor 32 of a diameter less than the diameter of the disk 30 and which has a plate 33 fixed to the upper side thereof to serve as a bearing for a plurality of rotatable planetary gears 34 which travel around a central driving gear 35 fixed to the shaft 29. Also fixed to the shaft 29 directly above the gear 35 is a gear 36 which is in constant mesh with a worm 37 carried by the drive shaft 38 of an electric driving motor 39. It will be seen that when the motor 39 is turned on, the worm 37 will impart a continuous movement to its companion gear 36 which movement is transmitted to the driving gear 35 of the planetary gear set which causes continuous rotation of all of the planetary gears 34 in one direction.

Journaled in the bearing bracket 28 and in a bearing bracket 40 is a vertically disposed shaft 41 which has a gear 42 fixed thereon and which is adapted to be engaged with the various gears 34 of the planetary gearing. The shaft 41 also carries a sprocket wheel 43 over which a sprocket chain 44 passes and which chain also passes around the second sprocket wheel 45 fixed to a vertically disposed shaft 46 mounted in a bearing bracket 47 and the upper end of the shaft 46 carries a gear 48 which is in constant mesh with the internal gear surface of a ring gear 49 carried by and depending upon the under side of the turn table 20. It will therefore be seen that if the rotor 32 on which the planetary gears 34 are carried is lodged against turning movement around shaft 29 and one of the planetary gears 34 is in mesh with the gear 42, that power will be transmitted from the electric motor through the planetary gearing and sprocket arrangement to the gear 48 which meshes with the ring gear 49 whereby rotation will be imparted to the stage or turn table 20. The means by which the rotor is held in position against rotation will be hereinafter described. Journaled in the bearing bracket 28 and in a bearing bracket 50 is a vertically disposed shaft 51 which is disposed diametrically opposite the shaft 41 whereby the planetary gearing is interposed between these shafts. Fixed to the shaft 51 and disposed on a plane with the planetary gears 34 is a driven gear 52 which is adapted to be engaged by the various planetary gears as they are brought into operative engagement therewith. The shaft 51 has a sprocket wheel 53 fixedly mounted thereon over which a sprocket chain 54 passes, and which chain also passes around a sprocket wheel 55 fixed to a stub shaft 56 journaled in a Z-shaped bearing bracket 57 which rises from the base or bottom wall of the casing. The stub shaft 56 carries a beveled gear 58 which has constant mesh with a companion bevel gear 59 fixed to a horizontally disposed shaft 60 which has its bearing in the bearing bracket 57 and in a bracket 61 which rises above the bracket 57 for a purpose to be explained. The shaft 60 carries a driving gear 62 which is interposed between and engages a pair of spaced smaller gears 63 fixed to shafts 64 which are also mounted in the bearing brackets 61 and 57. Fixed to the outer ends of the shafts 64 are sprocket wheels 65. Journaled in brackets 66 and disposed in alinement with the sprockets 65 are sprocket wheels 67 and passing over the two sets of sprocket wheels 65 and 67 are endless sprocket chains 68. Carried by the endless sprocket chains 68 are cranks 69 which are operatively connected to the respective sliding doors 13—13 adjacent the inner side edges thereof as best seen in Figure 5 of the drawings. It will be thus seen that when power is transmitted to the gear 62, simultaneous movement will be imparted to the sprocket chains 68 in opposite directions, whereupon the cranks 69 will tend to slide the doors to open and closed positions.

Mounted in the front wall of the casing at a convenient point is an electrical contact switch 70 which is worked by manipulating knob 71 journaled in the front wall and in which is set a tubular sleeve 72 for serving as a bearing for one end of a rotatable shaft 73 which carries a manipulating knob 74 on its outer end. The shaft 73 carries a gear 75 adjacent its inner end which is in constant mesh with a pair of spaced gears 76 fixed to one of the ends of a pair of reversely threaded rotatable screw shafts 77. The shafts 77 are journaled in the bearing brackets 61 and upstanding bearings 78 formed on the bearing bracket 28, and it will be seen that by manual rotation of the knob 74, the screw shafts 77 will turn simultaneously in reverse directions.

A carriage 79 bridges the spaced screw shafts 77 and is threadedly connected thereto whereby rotation of the shafts will impart sliding movement to the carriage for a purpose to be presently set forth. Rising upwardly from the top of the carriage 79 is a stop member 80 which carries a rubber bumper or cushion element 81. The member 80 constitutes a selective stop element which may be set to stop the rotation of the stage or turn table to cause the selected scene or set to be brought into registration with the stage opening, and which member coacts with coacting means on the turn table which will now be described.

Fixed to the underside of the turn table 20 and extending radially thereof are a plurality of slotted channel strips 82, there being one strip for each compartment 22. Slidable lengthwise of the channel strips 82 are nuts 83 for threadedly receiving the inner ends of threaded stop pins 84. The nuts 83 are set at different radial distances from the axis of rotation of said turn table and which are securely held in the adjusted position by the tightening of the threaded stop pins 84 against the under side of the rotatable turn table 20, as best seen in Figure 10 of the drawings. It will therefore be seen that when the carriage 79 is adjusted to a set position by the manipulation of the knob 74, the cushioned stop member 80 may be brought into the path of any one of the stop pins 84, and which position of the stop member 80 may be predetermined by providing a suitable indicating dial upon the front of the casing in association with an indicator on the manipulating knob 74. The various sets may be identified by name or numbers, and when the indicator on the knob is brought into registration with the selected number or name, the stop member 80 will be positioned in the proper place for engagement by one of the stop pins 84, which pin is of course the one which controls the registering of a particular scene or display with the stage opening.

For the purpose of preventing undue spinning of the rotor 32, I provide friction means which is engageable with the periphery thereof, and which means includes a pair of arcuate shaped jaws 85 which are pivotally connected together at one of their ends as at 86, while the opposite ends of the jaws terminate in spaced ears 87 through which a bolt 88 passes. Interposed between one of the ears 87 and the head of the bolt is an expansion spring 89, while threaded to the free end of the bolt is an adjustable clamping nut 90. It will thus be seen that by the turning of the nut 90, the jaws may be suitably adjusted to vary the degree of friction between the periphery of the rotor 32 and the friction or brake band 91 carried by the inner faces of the respective jaws 85. The friction placed upon the rotor 32 is of such a degree as to permit the rotor to turn when it is desired to bring the planetary gears into alternate engagement with the gears 52 and 42, but to arrest any overrunning of the planetary gears with the particular gear to be engaged thereby.

The electrical control switch 70 hereinbefore referred to includes a turntable contact arm 92 which is alternately engageable with sets of spaced contacts 93, and 94, by the turning of the manipulating knob 71 in opposite directions. The sets of contacts 93 and 94 are arranged in a circuit 95 with the driving motor 39, as best seen in Figure 11 of the drawings. Pivotally connected to one end of the switch arm 92 is a rod 96 which is movable on a plane substantially parallel to the sliding doors 13. The outer end of the rod 96 carries a resilient member 97 which is bent to provide a shoulder 98, while the terminal end adjacent the shoulder is bent downward to provide an inclined finger 99. A pin 100 is carried by one of the doors 13 for engagement with the shoulder 98 as the said door moves to an open position for the purpose of moving the switch arm 92 from its "on" position as shown in dotted lines in Figure 11 to an "off" or neutral position, for the purpose of shutting off the motor 39 when the selected scene or set has been brought into registration with the display opening. In Figure 11 it will be noted that the shoulder 98 on the resilient member 97 is disposed in the path of the pin 100 when the doors are closed, but the said pin engages the shoulder as just mentioned and actuates the rod 96 to move the switch arm 92 to a neutral position. When in neutral position, the inclined finger 99 engages a beveled cam face 101 formed on one end of a block 102 for the purpose of depressing the member 97 to dispose the shoulder 98 out of contact with the pin 100 to release the door for permitting the same to close upon further actuation of the switch arm 92.

Fixedly supported in the path of movement of one of the doors 13 is a spring contact member 103 adapted to be engaged by the said door just prior to its movement to a fully opened position for the purpose of causing the contact member 103 to engage a coacting contact 104. The contact members 103 and 104 are arranged in an electric light circuit 105 in which the electric lamps 25 hereinbefore referred to are also arranged. A manually operated switch 106 is also arranged in the circuit 105 to open and close the same by hand should it be desired.

Carried by one of the doors 13 and as best seen in Figure 7 of the drawings, there is a pivoted catch member 107. This member is mounted adjacent the inner side of the said door and includes a hook portion 108 and a depending arm 109 to which a finger 110 is pivotally connected for swinging movement in one direction. The joint connecting the finger 110 with the arm 109 may be an ordinary rule joint, and normally the finger is coextensive with the said arm 109 as shown in full lines in Figure 7. A spring 111 has one end connected to the door 13 and its other end to the hook portion of the catch member and serves the purpose of rapidly actuating the latch as the hook portion passes opposite sides of the axial center of the latch. The hooked portion 108 is engageable with a pin 112 carried by the other door 13 and locked therewith when the doors move to a fully closed position as the latch is provided with a beveled face 113, which engages the pin and causes the hook portion to move into locked engagement therewith.

Means is provided for actuating the catch member 107 from engagement with the pin 112, and which means embodies an arm 114 pivoted to a portion of the frame structure as at 115, while the free end terminates in a finger 116 which is disposed in the path of the finger 110 of the catch member 107. A contractile spring 116 acts upon the arm 114 to normally position the finger end 116 so as to be capable of striking the finger 110 to cause the catch member to move to unlocking position, or to that shown in dotted lines in Figure 7.

For the purpose of actuating the catch member 107 from its raised position to a position to be automatically engaged with the pin 108 when the doors close, I provide a stop member 117 which is carried by one of the rails 14 on which the doors slide. This stop member is provided with a beveled face 118 on a plane to be engaged by the hooked end of the catch member when the door moves to its fully open position. When striking the stop member 117, the catch member will be upset and moved to a position to automatically engage the pin 112 upon the return movement of the door to closed position. It will therefore be seen that upon each movement of the doors to closed position, the same will be locked, but are released by the actuation of the arm 114 and which arm is operated in a manner now to be explained.

The pivoted end of the arm 114 is disposed adjacent the periphery of the disk 30 and carries a roller 119 which rides over the periphery of the said disk and into engagement with the notches 31. The roller 119 is released from the notches 31 upon each actuation of the arm 114, caused by the rotation of the disk 30 with the rotor 32 during the shifting of one planetary gear from engagement with one of the driven gears 52 or 42. It will be seen that as the roller 119 moves out of a recess 31, the periphery of the disk 30 acts as a cam for moving the arm 114 from the full line position shown in Figure 5 of the dot and dash line position, and which movement causes the finger 116 to strike the tail finger 110 of the catch member 107 to cause disengagement of the catch from the pin 112. The notches 31 also receive a roller 120 carried by pivoted arm 121 which connects with a shank 122 which is slidable in a cylinder 123. The rod or shaft 122 is forced outwardly from the cylindrical casing by a spring 124 contained within the casing so as to normally force the roller against the periphery of the disk 30. The rollers 119 and 120 coact to hold the disk 30 and its connected parts in a position of operation, but the tension exerted thereon is not sufficient to interfere with the turning of the disk with the rotor 32 when the rotor turns to change the driving connection between the planetary gear 34 and the driven gears 52 and 42.

For the purpose of causing perfect registration of the selected scenic sets with the stage opening, I provide spaced notches or indentations 125 in the periphery of the turn table 20 as shown in Figure 5 of the drawings, while engaging the periphery of the turn table are spring actuated rollers 126 extending inwardly from the lens support. It will be appreciated that as the selected scenic set is brought into registration with the display opening, the rollers 126 seat in the notches 125 and tend to positively hold the turn table against accidental movement. However, the spring tension exerted upon the rollers 126 is not sufficient to prevent the riding of the same out of the notches upon turning of the turn table during the changing of the scenic sets into registration with the stage opening.

In operation, assume that the device is at rest with the doors 13 in closed position with the control switch 70 in neutral or off position as indicated in Figure 11 of the drawings. It is now desired to bring a selected set into registration with the stage opening 12, whereupon the operator proceeds to turn the knob 74 to bring the stop member 80 into the path of movement of the pin 84 extending beneath the turn table 20, which pin is the one which is intended to coact with the stop member 80 to bring the turn table to a stopped position. After the selective stop mechanism has been set, the manipulating knob 71 of the switch 70 is turned to a position shown in dotted lines in Figure 11, which closes the motor circuit 95 thus setting up the motor 39 in operation. The worm gear 37 driven by the motor 39 imparts rotation to the planetary gears 34 through gears 36 and 35, whereupon the rotor 32 will turn until one of the planetary gears 34 comes in mesh with the driven gear 42 of the turn table actuating mechanism. It will be understood that the doors 13—13 are held in locked position by the catch member 107, thus the door actuating mechanism is held against operation which permits the planetary gears 34 to idly ride over the gear 52 which transmits power to the door actuating means. Upon meshing engagement with one of the gears 34 with the gear 42, the rotor 32 and the parts fixedly connected therewith remain stationary, whereupon power is transmitted through the gearing to the gear 42 which in turn actuates the sprocket wheel 43 and imparts turning movement to the shaft 46 through the sprocket 44 and sprocket wheel 45. Power is transmitted from the shaft 46 to the ring gear 49 of the turn table 20 through gear 48 whereupon the turn table will revolve until one of the pins 84 engages with the pre-set stop member 80. At which time the selected scenic set will be in registration with the stage opening, and held against accidental movement by the spring actuated rollers 126 seating in the notches or grooves 125.

The doors 13 are still in closed position but upon locking of the gear 42 against further rotation due to the coacting stop elements 84 and 80, the planetary gears will move from engagement with the gear 43 until one of them contacts with the gear 52 of the door actuating mechanism. During the shifting of the planetary gears from engagement with the gears 42 and 52, the arm 114 is actuated by reason of the fact that the roller 119 moves out of one of the recesses or notches 31 and travels over the peripheral edge of the disk 30. During such movement, the finger 116 at the outer end of the arm 114 strikes against the finger 110 provided on the tail of the catch member 107 and causes the hook portion 108 of the catch member to be disengaged from the pin 112. This catch member is kicked off center so that it is moved to the position shown in dotted lines in Figure 7, thus the doors are unlatched for opening. It should be remembered that the motor is still in operation, and power is then transferred through one of the planetary gears 34 to the gear 52 which transmits power to the shaft 56 through sprocket wheel 53, sprocket chain 54 and sprocket wheel 55. The meshing beveled gears 58 and 59 transmit the power from the shaft 56 to the shaft 60, and which power in turn is transmitted to the pair of spaced shafts 64 through the gear 62. By rotation of the shafts 64, the sprocket chains 68 are driven in opposite directions and through the crank connections 69 between the doors and the respective sprocket chains, the said doors 13 will simultaneously move in opposite directions to open position.

Upon approaching open position, the pin 100 on one of the doors 13 strikes the shoulder 96 on the resilient member 97 which exerts a pull upon the rod 96 and returns the switch arm 92 of the switch 70 to an "off" or neutral position, whereupon the motor circuit 95 is open and the operation of the motor ceases, and simultaneously with this operation when doors have reached fully opened position, the inclined finger 99 at end of flexible element 97 carried on rod 96 is engaged with beveled face 101 causing the shoulder 98 to be disposed out of engagement and the path of the pin 100, so that when the switch is thrown again to make contact with 93 contact points, shoulder 98 will be free to pass clear of the pin 100.

As previously stated, the spring contact member 103 of the light circuit 105 engages the contact 104 when the doors are fully opened to close the light circuit and light the electric lamps 25 which throw light upon the scene or set on display.

Just prior to the movement of the doors 13 to fully opened position the catch member 107 engages the beveled face 118 of the bracket 117 which serves to upset the catch member to position the same on a plane whereby the beveled face 113 of the hook end of the catch member is on a plane with the pin 112 carried by the other door.

Assume that it is desired to change the scene or set on display to a different scene or set. The operator turns the knob 74 to the desired position which actuation moves the selective stop 80 to the desired radial position whereby it will be engaged by the pin 84 associated with the desired scenic set.

After the selective setting mechanism has been actuated, the manipulating knob 71 of the switch 70 is turned to an "on" position as previously mentioned so as to bridge the contacts 93, thus the motor circuit 95 is closed, and the motor 39 placed in operation. The planetary gears 34 remain in the same position as they were during actuation of the door operating mechanism to move the doors to open position and therefore the door opening mechanism is put into operation and the cranks 69 moved from the leads of the sprocket chains 68 opposite to those leads which cause the doors to move open whereupon the cranks are traveling in a direction toward each other which will of course move the doors 13 to closed position. During such movement, the contact is broken between the contact members 103 and 104, thus opening the electric light circuit 105. When reaching the fully closed position, the hooked end 108 of the catch member 107 automatically engages the pin 112, whereby the doors are locked and the door actuating mechanism also locked against further operation. This locking of the door actuating mechanism causes the planetary gear 34 to move from engagement with the gear 52 and into driving engagement with the gear 42 of the turn table actuating mechanism. When the planetary gearing 34 engages the gear 42, power will be transmitted to the turn table 20 in the same manner as previously explained, whereupon the stage will revolve until brought to a stop by reason of the engagement of one of the pins 84 with the preset stop member 80. Upon registration of the new scene or set with the stage opening, the door actuating mechanism is thrown into operation in the same manner as previously explained, whereupon the doors again open to display the new scene or set and the lights are automatically turned on to illuminate the same.

As previously stated, when the doors are in open position, the switch arm 92 is in a neutral position. Assume now that it is desired to shut off the device from further operation. The operator proceeds to turn the manipulating knob 71 of the switch 70 to the left to cause the switch arm 92 to engage contacts 94 and in so doing, the inclined finger 99 provided at the end of the flexible element 97 carried on rod 96 is engaged with the beveled face 101 which causes the shoulder 98 to be disposed out of the path of the pin 100. As soon as the switch is turned on to this position, the motor is set in operation, which imparts closing movement to the doors 13 in the manner already explained, but during movement of one of the doors to closed position, a depending bracket 127 fixed thereto engages a collar 128 carried by the rod 96. As the bracket 127 contacts with the collar 128, it will actuate the rod 96 to cause the switch arm 92 to move out of contacting engagement with the contacts 94 and assume a neutral or "off" position. The motor circuit is now open and the doors close with all parts at rest.

From the foregoing description it will be seen that I have provided a novel device which may be used in conjunction with sound reproducing instruments such as radios and phonographs for bringing in scenic sets which are in keeping or suggestive to the sound produced. If desired, the scenic sets may be made up in units for insertion in the various compartments 22 in order that they may be interchanged at will. It is believed that a device of this kind will greatly increase the pleasure derived by persons listening to sound reproduced by the instrument with which it is associated and provide beauty and decoration not now possible, although the device may be constructed as a unit in itself for advertising or other purposes for which it quite obviously is adaptable.

While I have shown and described what I deem to be the most desirable embodiment of my invention, I wish it to be understood that various changes in construction may be resorted to if desired, and I do not limit myself to the precise structural details herein set forth, nor to anything less than the whole of my invention limited only by the appended claims.

Having thus described the invention, what I claim as new and desire to secure by Letters Patent is:—

1. A scenic display apparatus comprising a casing having a display opening therein, a plurality of scenic sets, means for selectively moving said scenic sets singly into registration with said display opening, and automatic means for closing said display opening during movement of said scenic sets to display position.

2. A scenic display apparatus comprising a casing having a display opening therein, a plurality of scenic sets, and means for selectively moving said scenic sets singly into registration with said display opening, closure means for said display opening, and automatic means for opening and closing the same in timed accord with the changing of said scenic sets whereby said closure means is opened upon registration of the selected scenic set with said display opening and closed during the changing of said scenic sets.

3. A scenic display apparatus comprising a casing having a display opening therein, a plurality of scenic sets, and means for selectively moving said scenic sets singly into registration with said display opening, closure means for said display opening, means for opening and closing the same in timed accord with the changing of said scenic sets whereby said closure means is opened upon registration of the selected scenic set with said display opening and closed during the changing of said scenic sets, and illuminating means for automatically lighting said scenic sets as they are selectively brought into register with said display opening.

4. A scenic display apparatus comprising a casing having a display opening therein, a plurality of scenic sets movable past said display opening, selective stop means for interrupting the movement of said scenic sets to cause a predetermined scenic set to stop in registration with said display opening, mechanism operable for moving said plurality of sets to bring the selected one into display position in register with said display opening, and automatic means for closing said display opening during the movement of said scenic sets.

5. A scenic display apparatus comprising a casing having a display opening therein, a plurality of scenic sets movable past said display opening, selective stop means for interrupting the movement of said scenic sets to cause a predetermined scenic set to stop in registration with said display opening, and mechanism operable for moving said plurality of sets to bring the selected one into display position in register with said display opening, closure means for said display opening, and closure operating means automatically operable in timed accord with said mechanism to cause opening of said closure means upon registration of a selected scenic set with said display opening, and for closing said closure means during the changing of the display from one scenic set to another.

6. In an apparatus of the class described, a casing having a display opening therein, a pair of sliding doors for closing said display opening, a plurality of scenic sets movable past said display opening, motor driven means for moving said scenic sets, selective stop means for causing a desired scenic set to stop when it has moved into register with said display opening and door actuating means operable by said motor driven means for sliding said doors to a closed position prior to the changing from one scenic set to the selected scenic set and for automatically sliding said doors to an open position after the selected scenic set has reached its display position.

7. In an apparatus of the class described, a casing having a display opening therein, a pair of sliding doors for closing said display opening, a plurality of scenic sets movable past said display opening, motor driven means for moving said scenic sets, selective stop means for causing a desired scenic set to stop when it has moved into register with said display opening, and door actuating means operable by said motor driven means for sliding said doors to a closed position prior to the changing from one scenic set to the selected scenic set and for automatically sliding said doors to an open position after the selected scenic set has reached its display position, and means operable by said doors for rendering said motor driven means inoperative when reaching its open position.

8. In an apparatus of the class described, a casing having a display opening therein, a turntable mounted in said casing and having compartments therein, motor driven means for imparting rotation to said turn table, and adjustable selective stop means for causing any one of said compartments to stop in register with said display opening.

9. In an apparatus of the class described, a casing having a display opening therein, a turntable mounted in said casing and having compartments therein, motor driven means for imparting rotation to said turntable, selective stop means for causing any one of said compartments to stop in register with said display opening, and automatic means for rendering said motor driven means inoperative upon registration of the selected compartment with said display opening.

10. In an apparatus of the class described, a casing having a display opening therein, a turntable mounted in said casing and having compartments therein, motor driven means for imparting rotation to said turntable, and selective stop means for causing any one of said compartments to stop in register with said display opening, closure means for said display opening, and closure operating means operable by said motor driven means before and after operation of said turntable.

11. In an apparatus of the class described, the combination with a structure having an opening therein, a pair of sliding doors for closing said opening, and motor driven actuating means for simultaneously moving said doors in opposite directions for opening and closing the same, said means including a pair of endless chains, and cranks connecting the chains to the respective doors.

12. A scenic display apparatus comprising a casing having a display opening therein, a rotatable turntable mounted in said casing and having a plurality of separate compartments thereon for movement past said display opening, a ring gear carried by said turn table, a driven gear constantly in mesh with said ring gear, drive means for said driven gear, means for stopping said turn table to cause a selected compartment to register with said display opening, and automatic means for causing the disengagement of said drive means from said driven gear after movement of said turntable to a selected position.

13. In an apparatus of the class described, the combination of a rotatable turn table, driving means therefor, a plurality of stop members carried by said turn table and fixed at different radial distances from the axis of rotation of said turntable, an adjustable obstructing member for movement within the path of any selected stop member, and manually operable rotatable means for selectively moving said obstructing member within the circumferential range of the stop members.

14. In an apparatus of the class described, the combination of a rotatable turntable, driving means therefor, a plurality of stop members carried by said turn table and fixed at different circumferential planes, an adjustable obstructing member for movement into the path of any selected stop member, and manually operable means for selectively moving said obstructing member within the circumferential range of the stop members, said means including a carrier on which said obstructing member is mounted, screw shafts threaded to said carrier, and a rotatable manipulating knob operatively connected to said screw shafts.

15. In an apparatus of the class described, a casing having a display opening therein, doors for closing said opening, a plurality of scenic sets, door actuating mechanism, actuating means for selectively causing said scenic sets to register with said display opening, and driving means alternately engageable with said door actuating mechanism and said actuating means.

In testimony whereof I affix my signature.

JAMES CAGE.